(12) United States Patent  
Johnson

(10) Patent No.: US 8,140,897 B2  
(45) Date of Patent: Mar. 20, 2012

(54) TESTING METHOD FOR COMPLEX SYSTEMS

(75) Inventor: Peter John Johnson, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/059,347

(22) Filed: Mar. 31, 2008

(65) Prior Publication Data

US 2008/0244315 A1  Oct. 2, 2008

(30) Foreign Application Priority Data

Mar. 29, 2007 (EP) .................................. 07105188

(51) Int. Cl.  
*G06F 11/00* (2006.01)

(52) U.S. Cl. .............................................. 714/25; 2/48

(58) Field of Classification Search ................... 714/25, 714/38, 2, 48  
See application file for complete search history.

(56) References Cited

U.S. PATENT DOCUMENTS

| 6,820,251 | B1* | 11/2004 | Dwyer ......................... 717/130 |
| 7,562,255 | B2* | 7/2009 | El Far et al. ................... 714/38 |
| 2002/0116153 | A1* | 8/2002 | Wybouw-Cognard ........ 702/186 |
| 2004/0153837 | A1* | 8/2004 | Preston et al. .................. 714/39 |
| 2005/0015675 | A1* | 1/2005 | Kolawa et al. ................. 714/38 |
| 2007/0234293 | A1* | 10/2007 | Noller et al. ................. 717/124 |
| 2008/0120521 | A1* | 5/2008 | Poisson et al. ................. 714/26 |

* cited by examiner

*Primary Examiner* — Scott Baderman  
*Assistant Examiner* — Sarai Butler  
(74) *Attorney, Agent, or Firm* — Novak Druce + Quigg LLP

(57) ABSTRACT

A method of testing a complex system of components is provided. The method includes providing a test log for each component, each test log comprising a list of tests and a respective test routine for each test. The method also includes activating the test logs and commencing a test procedure of the complex system. The method further includes running one or more test routines, terminating the test procedure of the complex system, and creating a test report based upon the output of the test routines.

4 Claims, 4 Drawing Sheets

TESTING METHOD FOR COMPLEX SYSTEMS

RELATED APPLICATION

This application claims the benefit of European Application 07105188.2, filed on Mar. 29, 2007, which is incorporated herein in its entirety.

FIELD OF THE INVENTION

This invention relates to a method of testing a complex system of components, and more particularly to methods that apply a crash and recovery test methodology for complex topologies of network connected systems.

BACKGROUND

Test engineers endeavoring to provide Quality Assurance (QA) are expected to test and verify that a complex system of hardware and software components, which is provided to customers, can survive single or multiple component failures. However, there is currently no known way to do this across multiple products and with any degree of accuracy. One current methodology is for a test engineer to write test cases that fail individual components within the complex system and hope that this covers all the ways that a component can fail.

In today's computing environment, however, most systems do not have a single machine in isolation. Most systems combine a complex network of resources. Below is an example of a complex system, which in this case uses JMS (JAVA™ Message Service and HTTP (Hypertext Transfer Protocol):

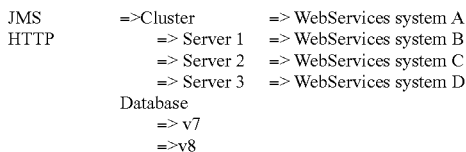

(Java and all Javabased trademarks and logos are trademarks of Sun Microsystems Inc in the United States, other countries, or both.)

This exemplary complex system has a topology of components that produces two points of entry, three servers in a cluster, four backend services and two databases. This complexity produces greater than ten parts that potentially need to be crashed in a testing method, in addition to the testing requirements for crashing parts of the system.

A known testing method is AIS (Automation Infrastructure and Solutions), which provides a test framework for executing tests. The framework gathers results from each component at the end of a test run. A report of test success/failure/coverage/etc. is then produced. A similar scenario is the automatic verify and install tests which some components provide, such as IVT (Install Verification Test) or power-on self checks used in, for example, a ThinkPad. These test routines provide validation that a component has been installed correctly. They are shipped with the component and executed when verifying that the component functions correctly.

The problem to solve is how to provide a suitable methodology that will allow a testing engineer to quality assure a complex system and provide statistics on how well the engineer has tested the crash and recovery of the overall solution. It is known in the prior art to carry out testing on a complex system, and it is known to analyze the results of the testing, but it is not currently possible to judge if the testing that has been carried out has been sufficiently rigorous to fully test the complex system at issue.

SUMMARY

It is therefore an object of the invention to improve upon the known art. According to a first aspect of the present invention, there is provided a method of testing a complex system of components. The method can include providing a test log for each component, each test log comprising a list of tests and a respective test routine for each test, activating the test logs, commencing a test procedure of the complex system, running one or more test routines, terminating the test procedure of the complex system, and creating a test report based upon the output of the test routines.

According to a second aspect of the present invention, there is provided a complex system of components. The system can include a test log for each component, each test log comprising a list of tests and a respective test routine for each test, a component within the system arranged to activate the test logs. The system can be arranged, when commencing a test procedure of the complex system, to run one or more test routines, and when terminating the test procedure of the complex system, to create a test report based upon the output of the test routines.

According to a third aspect of the present invention, there is provided a computer program product on a computer readable medium (e.g., optically-readable disk) for testing a complex system of components. The product can include computer-readable instructions for causing a computer or computing system to provide a test log for each component, each test log comprising a list of tests and a respective test routine for each test, activate the test logs, commence a test procedure of the complex system, run one or more test routines, terminate the test procedure of the complex system, and create a test report based upon the output of the test routines.

BRIEF DESCRIPTION OF THE DRAWINGS

Embodiments of the present invention will now be described, by way of example only, with reference to the accompanying drawings, in which.

DETAILED DESCRIPTION

Figure 1:
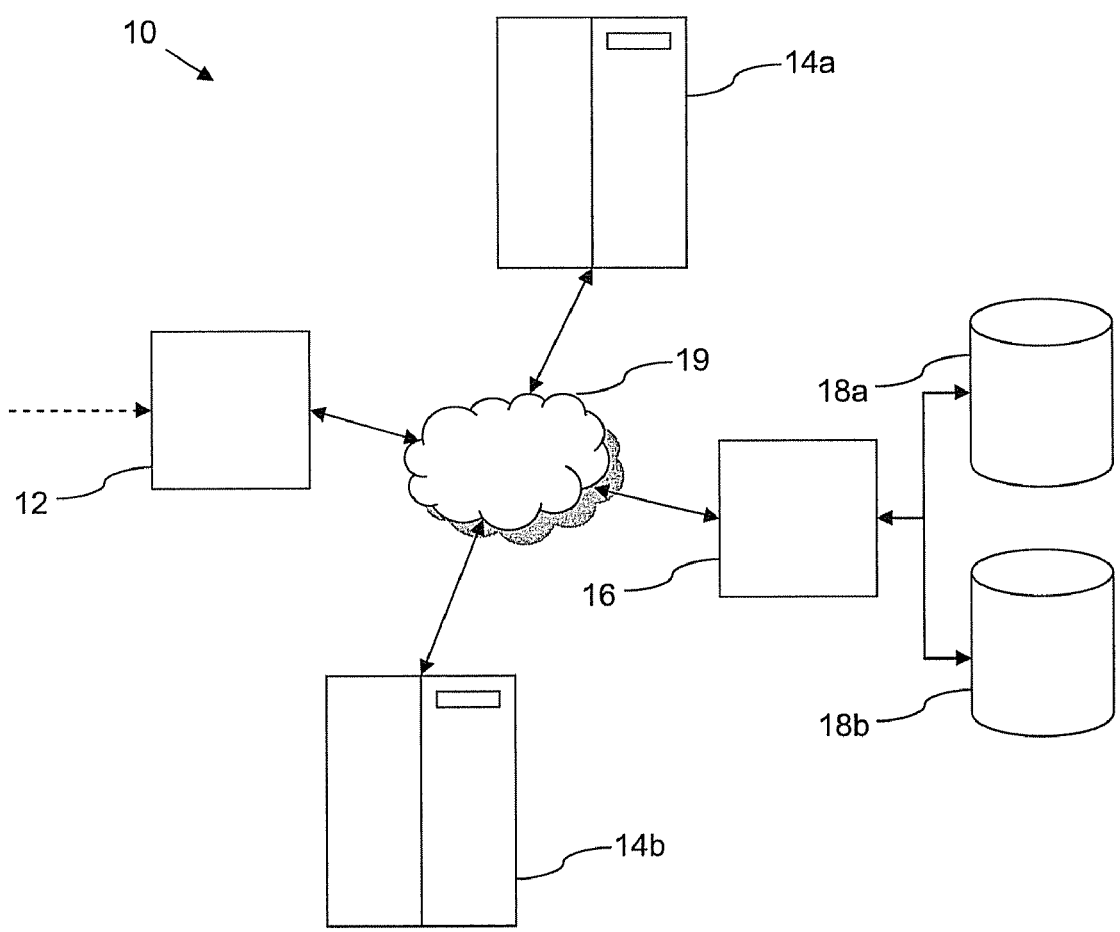
FIG. 1 is a schematic diagram of an exemplary complex system.

The present invention is directed to a system, methods, and computer product for testing complex systems. Owing to the invention, it is possible to provide, in an automated fashion, a testing solution that will be able to generate a valid measure of the testing carried out. The existence of the test log for each component of the system facilitates the appraisal of the testing carried out. A method of testing, according to one embodiment, produces a test report that will inform the test engineer the extent to which they have adequately tested the complex system at issue. In accordance with a preferred embodiment, this system provides a mechanism to determine the coverage of crash and recovery testing of a complex system composed of multiple machines and components. This goes beyond what is possible with conventional techniques and mechanisms, and the methodology of the invention describes how the individual components can be created to provide more data on how they can fail and how an engineer can quality assure complex systems using testing based on this new data.

Preferably, according to certain embodiments of the invention, each test routine is arranged to determine whether a failure has occurred. In addition to ascertaining whether a specific test has been carried out on a component, the routine can return a result for the actual test. Advantageously, the test report comprises, for each test routine, information on whether the respective test routine operated, and on whether the respective test routine returned a failure. The presentation of the results to a test engineer an include data from the running of the routines as to whether a failure has occurred. If a component in the complex system is a disk drive, for example, then there will be a corresponding test log for this disk drive. This test log will contain a series of tests and respective test routines, each of which relate to a test detailed in the log. For example, a test may be to carry out a million writes to the disk drive, and the test routine will monitor whether this takes place and will have information about what constitutes a failure, in respect of this test. This may be a failure rate of one per million. Other tests in the test log may relate to the number of writes or reads per second, etc. Ideally the test log for a respective component is stored by the component.

In one aspect, the invention describes how a component in this system should be created by the engineer. At development time, the engineer or team of engineers needs to create a list which details how their component can fail, which is referred to as the test log. Also some programming would be required to create some error detection routines that run alongside their code. Once these routines have detected a fail situation (loss of network, power supply switched off causing reboot, or the like), they update this test log to signify a failure has occurred. This log is then used to gather test intelligence data so that when a tester/QA assurance engineer builds a complex system and attempts to determine how much testing is required to cover the crash/recovery scenarios it is possible to more accurately determine how much testing an engineer has done and the extent of the coverage. This data is used to provide a measure, through the test report, of how reliable the complex system of components is that has been built and tested. The complex system has created a list of possible component failures and provides for a more accurate "ticking off" mechanism which an independent test person needs to do in order to validate how the combined set of products survives a failed component.

This methodology of the invention differs from AIS (Automation Infrastructure and Solutions) in at least two distinct ways. Firstly, the crash/recovery tests are created when the component is created and shipped with the component, and secondly, the AIS framework requires slave routines which are running on the test machine to be running. These slave routines would be disrupted by the nature of the testing namely crash/recovery (they may not recover themselves from the failure). The test routines used in the test log have a specific purpose of detecting a failure and, once the component has recovered, signals this error has happened. The AIS test programs do not necessarily know how to detect the crash/recovery situation.

The invention is different from IVT (Install Verification Test) in at least three ways. Firstly, the test routines detect crash and component failure not correct functioning of the component, and IVT Tests are normally positive tests to determine if the component is functioning correctly rather than whether the component has crashed. Secondly, the test routines, in the test logs, are on all components of the system, whilst self-test programs are on single components and there is no coordination of results. Thirdly, the tester of the overall system is normally unaware of the contents of the tests the IVT self-check test programs. The system of the invention lists them and makes them available, in a test report, for the tester, who has to test the overall solution in a structured way.

FIG. 1 is a schematic view of an exemplary complex system 10. This system 10 can be, for example, the hardware that supports an Internet site that retails goods to the general public. The components within this example system illustratively include a gateway 12, servers 14a and 14b, a database interface 16 and databases 18a and 18b. A network 19 illustratively interconnects some of the components. This is a fairly straightforward example of a complex system. In most practical implementations, however, many more components and interconnections will be present. It is also the case that a single component such as a server 14 may (for the purpose of testing) be considered to be made up of several smaller individual components, such as a disc drive, LAN connection and power supply, each of which component will need to be tested. An engineer will put together the system 10 to provide a specific solution to a customer's requirements. The hardware components shown in FIG. 1 will have software components that are either located on a specific hardware component, or are distributed amongst the hardware components. Once the engineer has built the system 10, then it is necessary to test the complex system 10. Historically, the effectiveness of this testing of the complex system relied upon the experience of the tester, and in addition, upon the knowledge of the tester in relation to the specific components within the system 10.

Figure 2:
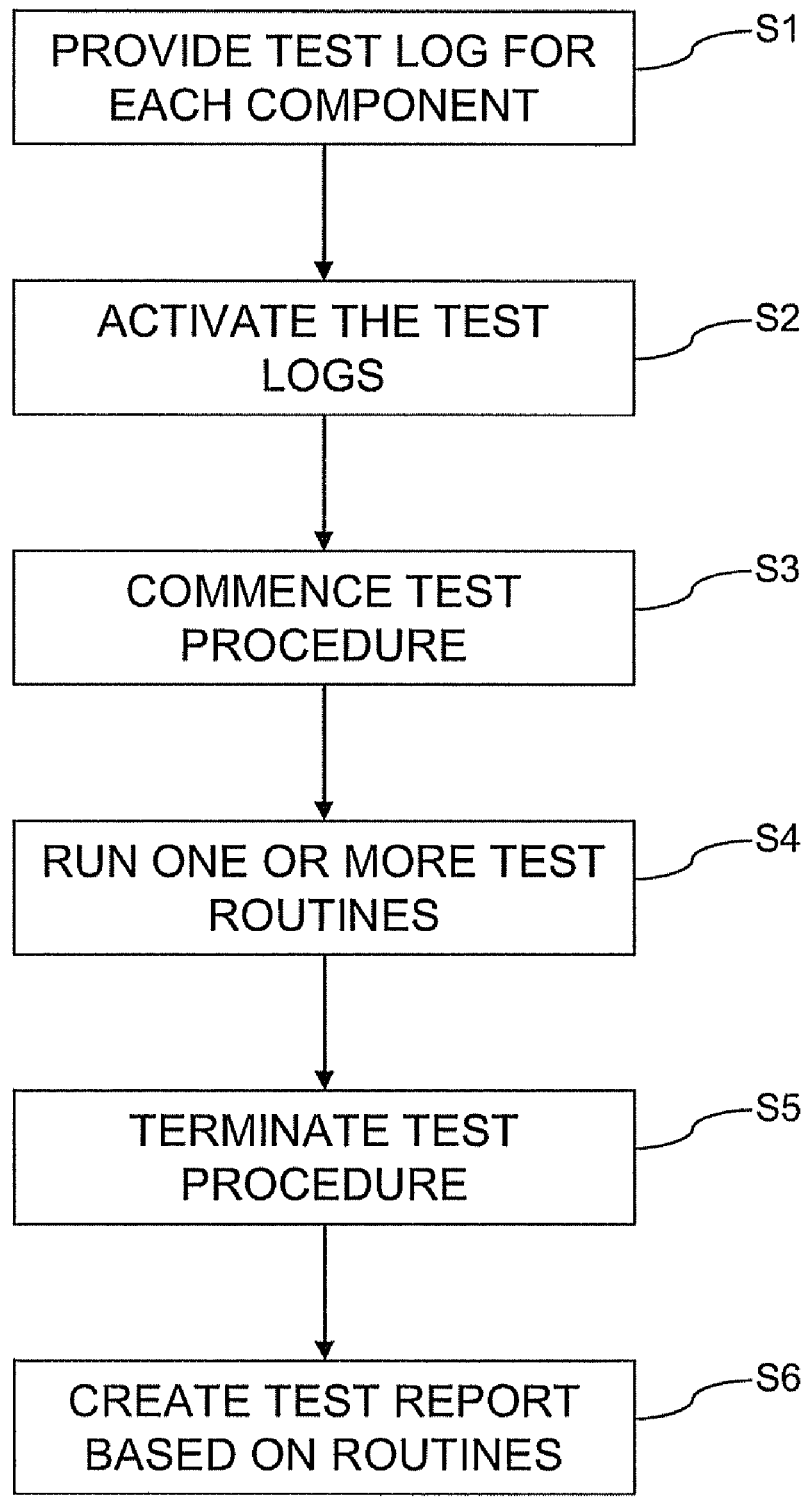
FIG. 2 is a flowchart of a method of testing the complex system of FIG. 1 in accordance with an embodiment of the present invention.

Referring additionally now to FIG. 2, a flowchart of a method of testing the complex system 10 in accordance with one embodiment of the invention is shown. The first step S1 is the step of providing a test log for each component in the system. The test log may be for a component such as a server 14a, 14b, or may be for a specific component such as a power supply within the server 14a, 14b. Each test log comprises a list of tests and a respective test routine for each test. During product development, each component, which can be a product, creates a list of ways that it can fail. This list, referred to as the test log, is provided by the software/hardware engineers who developed/created the component. One advantage of this methodology is that those individuals who are the experts on the individual components will create the respective test log for that specific component.

When the component is running, a test routine will be created that determines if a specified failure has occurred. So, for example, if the CPU is 100% or if the network connection has gone down, then this is detected. The error detection can either be as it happens, in which case suitable programming can be provided to allow for the detection to be logged. If the resources of the machine were very critical, then this would be difficult, or it may be during the component restart that the error can be classified. These small routines are referred to as test routines.

The second step S2 is to start the test logging by activating the test logs. The mechanism to update the "Test log" is activated on the test system for all components within the system 10. Every time a component failure is detected by the component, the lists are updated. These lists are held internally within each component. Once the test logs are activated, at step S2, so that they are ready to acquire data about the testing to be undertaken, then at step S3, the process continues by commencing a test procedure of the complex system 10. This testing can be automatically generated or can be manually executed by a tester. The test procedure would fail the overall solution 10 by trying to simulate what a customer may experience. This may include such things as for example power failure, network failure, data latency and message overload, and the like.

Step S3 which is manual, could in principle be automated, especially if the individual components could have built into them additional routines that could generate the failures and/or crashes that the tester is trying to force. The fault routines that have been created for each component, and form part of the respective test log for each component would now be run, at step S4. These tests could be run at anytime or could be running all the time in the background as the test procedure is carried out. The test routines detect that failures have occurred and they update the test log to show that an instance of a specific failure has occurred.

Once the tester (or automated routines) has completed the testing, then, at step S5 there is the terminating of the test procedure of the complex system 10. At this point testing stops and results are gathered. In a system with test analysis software the software would gather the reports from each component and analyze the results to see if the tester has tested the failure paths. At step S6 a test report is created based upon the output of the test routines. The report created comprises a compilation of crash and recovery statistics.

One advantage of the methodology described above with respect to FIG. 2 lies in the providing of a list of crash/recovery tests, in the test log, for each component at the time the component is being developed, in the crash detection routines which are started when the testing of the overall system is to be tested, and in the post processing of the conclusions of the crash detection routines and the presentation of that material in a meaningful way to the tester.

Figure 3:
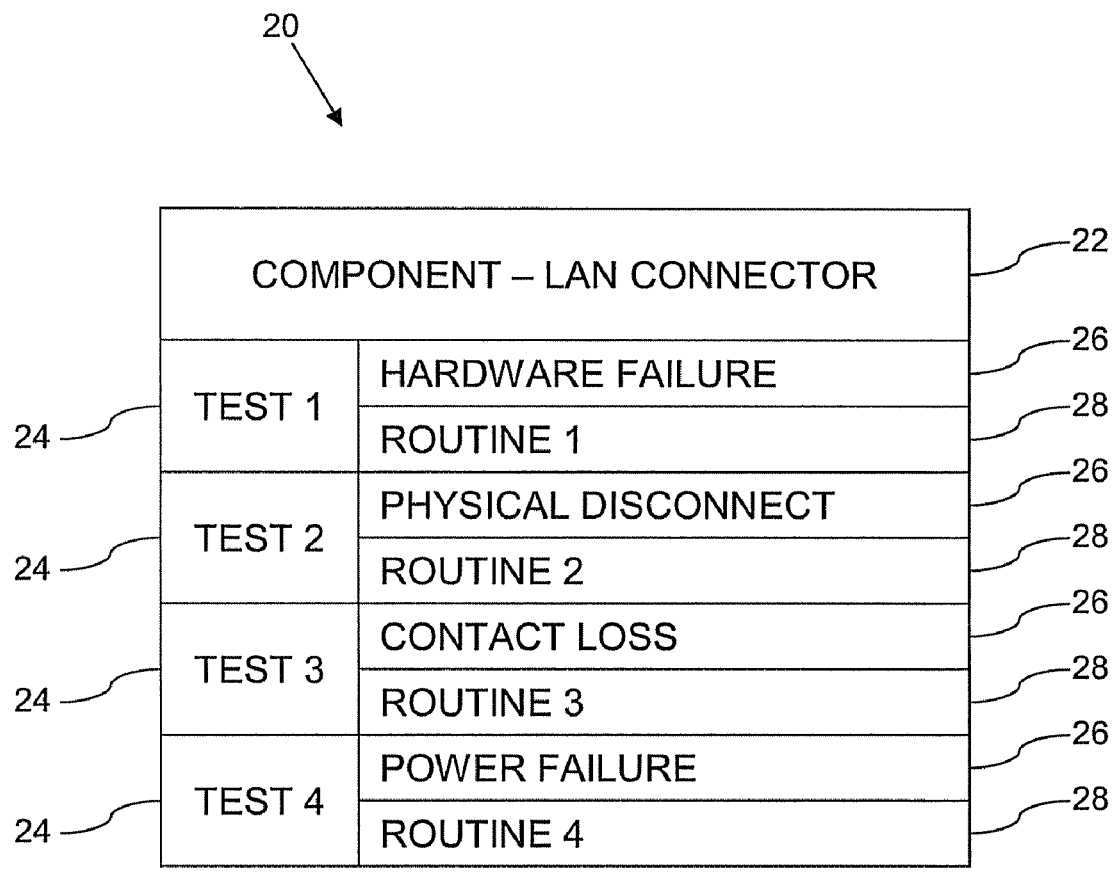
FIG. 3 is a schematic diagram of an exemplary test log generated in accordance with an embodiment of the invention.

FIG. 3 shows a schematic representation of an exemplary test log 20 generated in accordance with an embodiment of the invention. In the complex system 10 of FIG. 1, for simplicity, each physical machine that makes up the topology has three components and there exists four tests per component. For example, a server 14 of the system 10 comprises first component internal disc drive, second component LAN connection, and third component power supply. The test log 20 in FIG. 3 is for component two (the LAN connection), for which there are four tests in the test log 20. The test log includes the component title/identifier 22, the tests 24 and a respective test title 26 and test routine 28 for each test 24. The test log 20 and the test routines 28 would be written by the developers of the LAN Card. For each test 24 in the test log 20, more detailed information is available. For each of the four tests 24 in the log 20 shown in FIG. 3, then this can be as follows:

Test 1 Title: Hardware failure Description: Internal failure of connector A and B;

How to crash test: To manual test for this physically open up the back of the machine to get access to the LAN card. Tester to short connectors A and B on the LAN card using a wire, for at least one second;

Recovery: Just recover by removing the wire;

Test 2 Title: Physical cable has been pulled out of the card Description: Physical disconnection of network. How to crash test: To manual test for this physically pull the LAN cable out of the card for at least 20 seconds;

Recovery: Plug cable back in;

Test 3 Title: Lost contact with network Description: Card cannot communicate to network;

How to crash test: To manual test for this physically pull the LAN cable out of the card for at least 5 seconds;

Recovery: Plug cable back in;

Test 4 Title: Power failure for the card 20 Description: Power loss to card How to crash test: To manually test for this physically pull the power cable out of the machine;

Recovery: Plug power cable back in and restart server.

These four tests define the extent of the testing needed to satisfactorily test the LAN card component. The routines 28 within the test log monitor whether the specific test has been carried out during the test procedure that is commenced at step S3 of FIG. 2 and finished at step S5.

Figure 4:
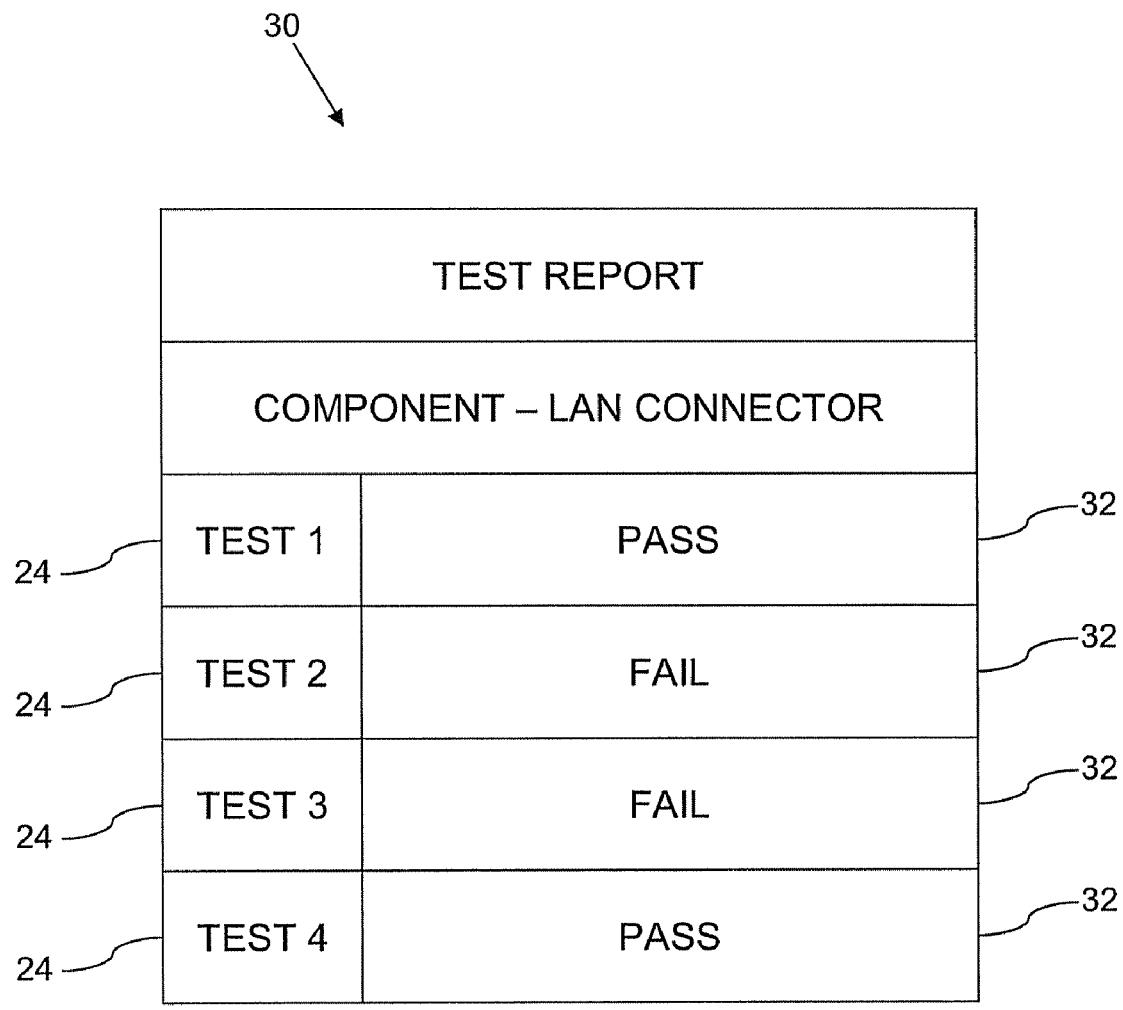
FIG. 4 is a schematic diagram of an exemplary test report generated in accordance with an embodiment of the invention.

FIG. 4 illustratively provides a very simplified version of a test report 30, which relates to the component, the LAN connector, which is the subject of the test log 20 of FIG. 3. The tests 24, in the report 30, each have a corresponding result 32. In reality, the test report 30 will contain multiple test results 32 for each component within the complex system 10. The generation of the test report 30 follows the test procedure of physically pulling the LAN cable from the LAN card, for a period of thirty seconds. This action by the tester is sufficient to satisfy the test requirements of Test 2 and Test 3, hence they return a fail in the test report 30 (as detected by the associated test routines 28). This shows that the test procedure has successfully carried out a partial testing of the system with respect to the specific component of the LAN card. The test report 30 can be used by the tester to refine their testing, as it is clear from the report 30 that some aspects of the LAN card have not been correctly tested by the procedure adopted by the tester. The tester also has access to the test log 20 for each component, and can use this to see the recommended actions required to successfully complete each of the tests 24. The report 30 is showing which tests within the associated test log 20 for a specific component have been carried out.

I claim:

1. A method of testing a complex system composed of multiple components comprising:

providing a test log for each component, each test log comprising a list of tests for a corresponding component and respective test routines for each of the tests, wherein each of the test routines is arranged to cause a particular failure in the corresponding component, to determine whether the particular failure has occurred in the corresponding component, to provide recovery of the corresponding component from the particular failure, and to generate a signal indicating the occurrence of the particular failure if the corresponding component recovers, wherein the test log and the test routines are provided by the developer of the corresponding component, and wherein the test log for the corresponding component is stored internally within the corresponding component;

activating the test logs for all components of the complex system;

commencing a test procedure of the complex system;

for each component, attempting to run the test routines in the test log associated with the component, wherein upon detecting a fail situation, the test log is updated to signify a failure has occurred;

terminating the test procedure of the complex system; and creating a test report based upon an output of the test routines, wherein the test report comprises, for each of the test routines, information on whether the each of the test routines operated, and information on whether the each of the test routines returned a failure, wherein the information on whether each of the test routines operated comprises information on whether each of the test routines was able to run to completion.

2. A complex system composed of multiple components comprising:

a test log for each component, each test log comprising a list of tests a corresponding component and respective test routines for each of the tests, wherein each test routine is arranged to cause a particular failure in the corresponding component, to determine whether the particular failure has occurred in the corresponding component, to provide recovery of the corresponding component from the particular failure, and to generate a signal indicating the occurrence of the particular failure if the corresponding component recovers, wherein the test log and the test routines are provided by the developer of the corresponding component, and wherein the test log for the corresponding component is stored internally within the corresponding component; and at least one processor within the system arranged to:
activate the test logs for all components of the complex system;
commence a test procedure of the complex system;
for each component, attempt to run the test routines in the test log associated with the component, wherein upon detecting a fail situation, the corresponding test log is updated to signify a failure has occurred;
terminate the test procedure of the complex system; and
create a test report based upon an output of the test routines, wherein the test report comprises, for each of the test routines, information on whether the respective test routine operated, and information on whether the respective test routine returned a failure,
wherein the information on whether each of the test routines operated comprises information on whether each of the test routines was able to run to completion.

3. A computer program product on a non-transitory computer readable medium for testing a complex system composed of multiple components, the product comprising computer-readable instructions for causing a computer to:

provide a test log for each component, each test log comprising a list of tests for a corresponding component and respective test routines for each of the tests, wherein each of the test routines is arranged to cause a particular failure in the corresponding component, to determine whether the particular failure has occurred in the corresponding component, to provide recovery of the corresponding component from the particular failure, and to generate a signal indicating the occurrence of the particular failure if the corresponding component recovers, wherein the test log and the test routines are provided by the developer of the corresponding component, and wherein the test log for the corresponding component is stored internally within the corresponding component;

activate the test logs for all components of the complex system;
commence a test procedure of the complex system;
for each component, attempting to run the test routines in the test log associated with the component, wherein upon detecting a fail situation, the test log is updated to signify a failure has occurred;
terminate the test procedure of the complex system; and
create a test report based upon an output of the test routines, wherein the test report comprises, for each of the test routines, information on whether each of the test routines operated, and information on whether the each of the test routines returned a failure,
wherein the information on whether each of the test routines operated comprises information on whether each of the test routines was able to run to completion.

4. The computer program product according to claim 3, wherein the test log further comprises a quality of service level for each test in the test log.

* * * * *